United States Patent [19]
Collin et al.

[11] Patent Number: 5,316,628
[45] Date of Patent: May 31, 1994

[54] PROCESS AND DEVICE FOR THE SIMULTANEOUS TRANSFER OF MATERIAL AND HEAT

[75] Inventors: Jean-Claude Collin, Marsinval-Verneiul; Joseph Larue, Chambourcy; Alexandre Rojey, Garches; Jean-Charles Viltard, Marly le Roi, all of France

[73] Assignee: Institut Francais du Petrole, Rueil Malmaison Cedex, France

[21] Appl. No.: 656,169
[22] PCT Filed: Jun. 29, 1990
[86] PCT No.: PCT/FR90/00490
   § 371 Date: Apr. 24, 1991
   § 102(e) Date: Apr. 24, 1991
[87] PCT Pub. No.: WO91/00141
   PCT Pub. Date: Jan. 10, 1991

[30] Foreign Application Priority Data

Jun. 30, 1989 [FR] France .................... 89 08856

[51] Int. Cl.$^5$ ............................................ B01D 3/28
[52] U.S. Cl. ............................ 203/72; 55/241; 159/28.6; 159/49; 159/901; 165/104.28; 165/166; 202/158; 202/236; 202/267.1; 203/86; 203/89; 261/112.2
[58] Field of Search ............ 203/72, 86, 89, DIG. 23; 159/28.6, 49, 901; 165/166, 104.28, 914, 167, 115; 202/158, 236, 267.1; 261/94, 153, 112.2; 55/241, 233

[56] References Cited

U.S. PATENT DOCUMENTS

| | | | |
|---|---|---|---|
| 3,150,028 | 9/1964 | Wennerberg | 159/28.6 |
| 3,343,821 | 9/1967 | Winn et al. | 261/112.1 |
| 3,469,617 | 9/1969 | Palmason | 159/28.6 |
| 3,610,330 | 10/1971 | El Din Nasser | 165/166 |
| 3,661,721 | 5/1972 | Rodgers | 202/172 |
| 3,840,070 | 10/1974 | Becker et al. | 202/187 |
| 3,959,419 | 5/1976 | Kitterman | 261/112.1 |
| 4,051,898 | 10/1977 | Yoshino et al. | 261/83 |
| 4,139,584 | 2/1979 | Holmberg | 261/112.2 |
| 4,211,610 | 7/1980 | McGowan | 202/177 |
| 4,597,916 | 7/1986 | Chen | 202/158 |
| 4,599,097 | 7/1986 | Petit et al. | 62/36 |
| 4,764,254 | 8/1988 | Rosenblad | 159/28.6 |
| 4,832,115 | 5/1989 | Albers et al. | 261/153 |
| 4,844,151 | 7/1989 | Cohen | 165/166 |
| 4,853,088 | 8/1989 | Conway | 159/28.6 |

FOREIGN PATENT DOCUMENTS

| | | | |
|---|---|---|---|
| 2117628 | 7/1972 | France | 159/28.6 |
| 4226178 | 12/1942 | Japan | 159/28.6 |

*Primary Examiner*—Virginia Manoharan
*Attorney, Agent, or Firm*—Antonelli, Terry, Stout & Kraus

[57] ABSTRACT

A process for simultaneously exchanging material and for exchanging heat, material change being effected between a gas phase and at least one liquid phase by contact and passage in opposite directions of the gas phase and of the at least one liquid phase and heat exchange being effected between a compartment (I) and another compartment (II). In compartment (I) a plurality of spacer plates defining material exchange passages are arranged and the material exchange is effected by causing the at least one liquid phase to flow over a substantially vertical or inclined wall of a corrugated spacer plate having perforations and by causing at least a fraction of the gas phase to traverse simultaneously said perforations in a substantially ascending direction to contact said at least one liquid phase. The heat exchange is effected by circulating a heat exchange fluid in the compartment (II) which has a common wall with the compartment (I).

18 Claims, 3 Drawing Sheets

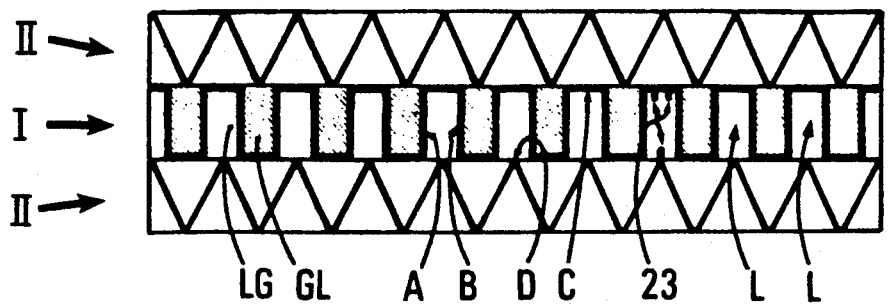
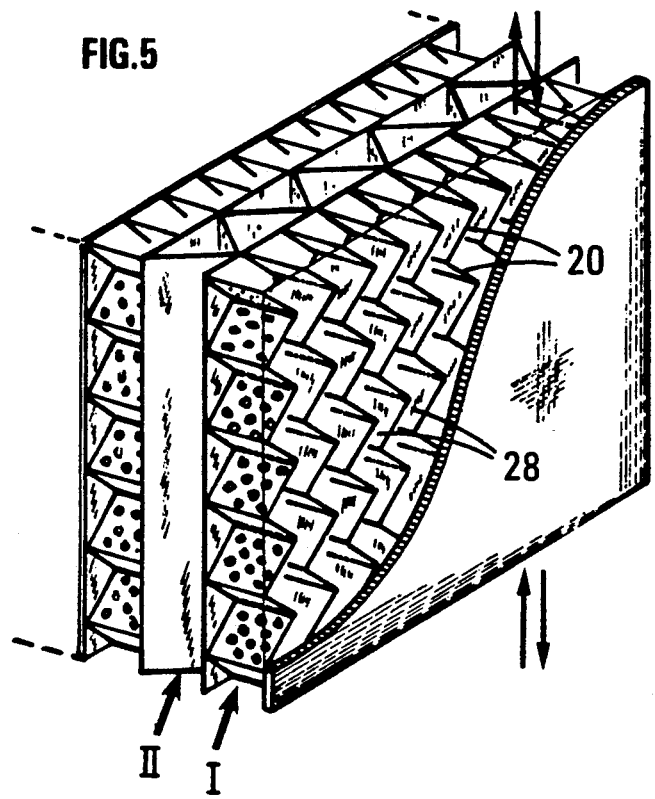
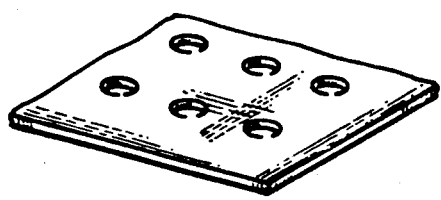
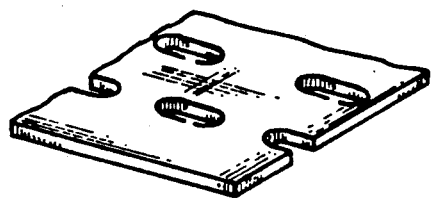
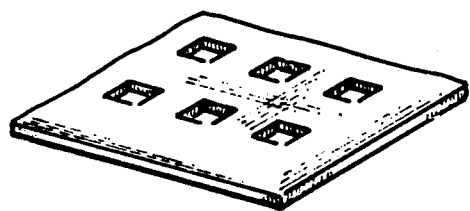

PROCESS AND DEVICE FOR THE SIMULTANEOUS TRANSFER OF MATERIAL AND HEAT

BACKGROUND OF THE INVENTION

The invention relates to a process and a device allowing material and heat to be transferred between a gas phase and one or two liquid phases and simultaneously allowing heat exchanges with another fluid.

This invention employs a device having several compartments delimited in particular by a stack of several flat plates, each plate being spaced apart from the next plate. This separation space may be occupied by corrugated plates. This type of arrangement is already used to carry out heat exchanges. The fluids circulate in passages formed between two adjacent plates. These passages are alternate and allow co-current circulation between the hot flow and the cold flow, or counter-current circulation. This type of exchanger improves the heat transfer coefficient but does not allow material to be transferred.

In general, the technology developed for making such heat exchanges is widely known. As stated, these exchangers are composed of a stack of stamped sheet metal. The space between the plates is filled with spacers composed of baffles formed directly in the sheet metal by stamping, or by spacer plates called waves, made of straight metal.

The spacer waves maintain a uniform spacing between the plates, and some of them create a secondary exchange surface. In general, the spacer waves increase the rate of flow, and improve the ability of the system to withstand pressure. All these metal sheets are joined to each other either by welding or by brazing, which provides a good seal between the plates but makes it practically impossible to clean the assembly mechanically, or by bolting which makes it necessary to use gaskets between the plates to prevent communication between the two fluids and leakage to the outside. Whatever the type of these systems, they all improve, to a greater or lesser degree, the specific exchange surface and the heat transfer coefficient.

All the inlets to the compartments receive the same fluid (for example, hot fluid), communicate with each other, and are in communication with a box called the exchange header. This box is joined to the assembly either by welding or by bolting with a gasket. The same type of assembly is performed for the outlet connections. Thus, in general, an exchanger supplied with two different fluids has four headers, two inlet headers, one for each fluid, and two outlet headers, one for each fluid.

The prior art, U.S. Pat. No. 3,568,462, also teaches circulating a film of condensed liquid flowing downward and a vapor phase flowing upward in compartments through a perforated horizontal plate or wave.

However, such a device has its drawbacks. It generates a substantial pressure loss since the fluids are forced to pass through horizontal plates. Such an arrangement requires the size of the perforations to be increased, to the detriment of the quality of the gas-liquid contact, the flowrates treated, and the mechanical rigidity of the device.

SUMMARY OF THE INVENTION

Thus, the present invention relates to a material exchange process between a gas phase G and at least one liquid phase L, according to which at least a fraction of each of these phases is made to contact the other by circulation in opposite directions of the gas phase and of the liquid phase and, moreover, a heat exchange is simultaneously effected between the gas and liquid phases, and a fluid F.

According to the invention, the liquid phase is trickled along or through a substantially vertical or inclined wall having perforations and these perforations are traversed by at least a fraction of the gas phase. This perforated wall can be of the corrugated type.

The gas phase may pass through these perforations in its totality.

The liquid phase may be made to circulate by gravity.

The counter-current contact may be brought about between a vapor phase G and a liquid phase L formed at least partly by condensation of at least part of the vapor phase. The refrigeration necessary to condense a fraction of the gas phase in order to obtain the liquid phase may be supplied at least in part by heat exchange with fluid F.

The counter-current contact may be effected between a liquid phase L and a vapor phase G formed at least in part by vaporization of at least part of the liquid phase, the heating power necessary to vaporize a fraction of the liquid phase in order to obtain the gas phase may be furnished, at least in part, by heat exchange with fluid F.

The counter-current contact may be brought about between a gas G containing methane, hydrocarbons with more than 1 carbon atom, water, and methanol, and two liquid phases L1 and L2, formed by condensation of at least part of gas G. Liquid phase L1 may be formed principally from hydrocarbons other than methane and liquid phase L2 may be formed principally by a solution of methanol in water.

The present invention also relates to a device for simultaneously effecting a material exchange between a gas phase G and at least one liquid phase L by counter-current contact, as well as a heat exchange with at least one fluid F. This device has a stack of substantially flat, vertical plates separated by corrugated spacer plates, forming at least two alternating series of compartments I and II, the compartments of second series II being traversed by fluid F exchanging heat with liquid phase L and gas phase G and the corrugated spacer plates located in the compartments of first series I are perforated.

According to the invention, the corrugated spacer plates located in Type I compartments form waves in an essentially vertical or inclined direction and the compartments in first series I are traversed counter-currentwise by liquid phase L and gas phase G.

The waves which form the spacer plates delimit channels in which liquid phase L and gas phase G circulate.

According to one variant of the invention, at least some of these channels terminate at the upper edges of the plates and some at the lower edges of the plates, allowing the channels to communicate with the fluid inlet and outlet headers.

The open fraction formed by the perforations may be between 3% and 30%, preferably between 3% and 20%, relative to the surfaces of the corrugated plates; said liquid phase may form a film at the surfaces of said corrugated plates and said gas phase passing through said corrugated plates all the way through said perforations.

The compartments in the first series may be Type I compartments and those of the second series, Type II compartments. The corrugated spacer plates located in the compartments of first series I may form waves in a vertical direction (FIGS. 1, 2), with the gas phase entering the device through subcompartments whose openings are located on one side of said corrugated spacer plates and leaving the device through other subcompartments whose outlets are located on the opposite side of said corrugated spacer plates.

The corrugated spacer plates located in the Type I compartments can also form waves inclined alternately in symmetrical directions relative to a horizontal direction, the average direction of the passages delimited by these zig-zag waves being substantially vertical. The corrugated spacer plates located in the Type I compartments may form waves with a square or sinusoidal cross section.

The perforations may be circular and have diameters between 1 and 5 millimeters.

The corrugated spacer plates may be fitted with turbulence promoters.

The space between the plates forming Type I compartments may be between 3 and 50 millimeters.

The device according to the invention may be made from aluminum plates assembled by brazing.

The device according to the invention may be applied to reducing the process according to the invention to practice.

The present invention also relates to the use of the device presented hereinabove for treating a petroleum effluent.

Thus, the present invention allows an intimate contact to be effected in the Type I compartments between two phases, a liquid phase L and a gas phase G forming a liquid film at the surface of the plates, causing this liquid film to be traversed by the gas phase through perforations made in the corrugated spacer plates.

The intimate contact obtained by the process and device according to the invention, between liquid phase L and gas phase G, allows and favors the transfer of material between the phases. The different arrangements of the corrugated spacer plates located in the Type I compartments form waves having a generally vertical direction, a strictly vertical direction, or waves that are inclined alternately. These arrangements affect the efficiency of material transfer and the pressure loss in the Type I compartments.

It is for these reasons that the invention covers different geometries and arrangements of the corrugated spacer plates of the Type I compartments. The choice of geometries and arrangements depends on the case in question, and must meet the operating conditions imposed by the specific implementation conditions. The choices have to do essentially with the orientation of the corrugation axis relative to the fluid flow, and with the shape and perforations of the waves.

When the walls are inclined, it is possible for at least one of the passages they form to allow at least a part of the effluents flowing along it to pass all the way through it without being forced through the perforations provided in the spacer walls which delimit this passage. Such a passage may be called a direct passage, since it connects the inlet and outlet headers directly to the Type I compartments of the device.

The use of vertical perforated waves solves numerous problems.

In the case of vertical waves, the pressure losses are seen to be far smaller than in the case of horizontal waves (by a factor which may be greater than 10), which is important in the case of a gas treatment operation as a pressure drop requires expensive recompression of the gas.

Moreover, the use of vertical waves makes it possible to treat far greater gas flowrates, as the use of horizontal waves results in rapid clogging. The use of vertical waves also allows better distribution of the phases, with the flows of the phases being guided all the way through, leading to greater contact.

Moreover, the use of vertical waves allows the perforation area to be smaller (3 to 20%) and to have the waves play a mechanical role, holding plates and exchanging heat.

The problems mentioned above are also solved, at least partially, by the use of inclined waves delimiting one or preferably several inclined passages.

The beneficial effects mentioned above are particularly important in the case of a three-phase contact (one gas phase and two liquid phases) which, in the case of horizontal waves, leads to a particularly high pressure loss and rapid clogging, as well as to difficulties in distribution of the two phases.

The liquid and gas phase distribution device consisting of creating subcompartments allowing passage of the liquid phase and the gas phase improves efficiency.

It will not be a departure from the present invention if the various effluent passages have a lining improving contact between the phases contained in the Type I compartments.

BRIEF DESCRIPTION OF THE DRAWINGS

The present invention will be better understood and its advantages will emerge more clearly from the following description of particular examples that are not limiting in any way whatever, illustrated by the attached figures wherein:

FIGS. 2 and 3 represent an embodiment derived from the foregoing in which the subcompartments of a given compartment in which heat exchanges are effected are blocked alternately at their upper parts;

FIGS. 4, 9, and 10 illustrate different examples of perforations;

FIG. 5 represents an exchanger according to the invention having corrugated spacer plates each of which has a succession of inclined planes that may be arranged symmetrically two by two relative to a horizontal plane;

DETAILED DESCRIPTION OF THE INVENTION

Figure 1:
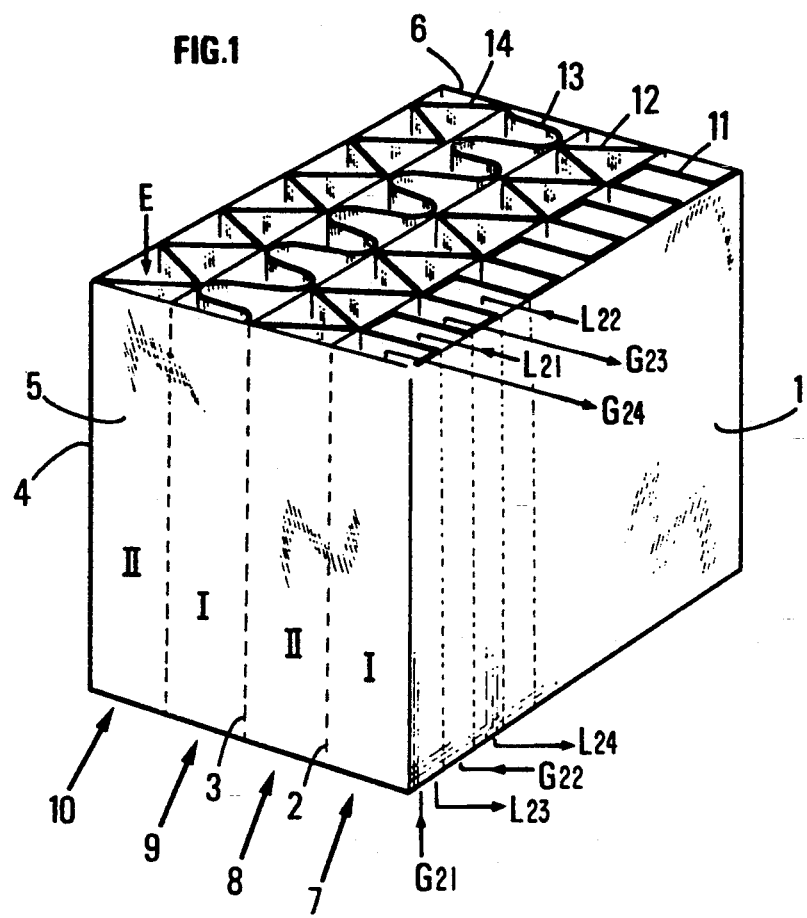
FIG. 1 represents a first embodiment of the device according to the invention where the corrugated spacer plates are disposed vertically.

The device in FIG. 1 has a stack of plates 1, 2, 3, 4 . . . , as well as two other plates 5 and 6 perpendicular to said plates. These plates, as shown in FIG. 1, are imperforate.

This set of plates forms compartments 7, 8, 9, and 10 which are alternately of different types, Type I and Type II. The Type I compartments, or first series of compartments, are designed to receive the fluids for which there is a material exchange. One of these fluids, G, is essentially gaseous, while the other, L, is essentially liquid. The Type II compartments, or second series of compartments, are designed to receive fluid E with which the fluids circulating in compartments I exchange heat.

Corrugated spacer plates 11, 12, 13, and 14 are disposed between stacked plates 1, 2, 3, and 4. These spacer plates maintain the spacing between the stacked plates and participate in the cohesion of the whole. Moreover, they favor heat exchanges. Finally, according to the present invention, the spacer plates located in the Type I compartments have perforations which favor exchange of materials between the G and L phases; whereas the spacer plates located in the type II compartment are imperforate (note, FIG. 5).

In FIG. 1, plates 1, 2, 3, 4, 5, and 6 are vertical and the corrugated spacer plates, particularly the perforated plates of the Type I compartments, are characterized by corrugations in a vertical direction. Free spaces or subcompartments are formed by the corrugations in plates 11 and 13, where spacer plates 11 are shaped like crenelations and spacer plates 13 have sinusoidal shapes. The liquid is injected in the upper part of the device in these spaces, for example at L21, L22. This liquid or liquid phase coming from condensation of a gas or the two together trickle downward forming a liquid film over the whole or over part of the surface or walls of the waves. The gas is injected into the lower part of the device at G21, G22 thus effecting countercurrent circulation of liquid phase L relative to gas phase G. The perforations in the spacer plates of compartments I allow at least some of the gas to circulate from one space or subcompartment to an adjacent space or subcompartment, thus passing through the liquid film trickling down the wave. The intimate contact thus formed between gas phase G and liquid phase or phases L brings about a material transfer between these phases while simultaneously exchanging heat with fluid F circulating in Type II compartments. Gaseous phase G is recovered in the upper part of the device at G23, G24. The liquid phase is evacuated in the lower part at L23, L24.

Of course, when these perforations are referred to, they are the perforations in a wall common to two different subcompartments for which there may be a passage of gas from one subcompartment to another.

Figure 2:
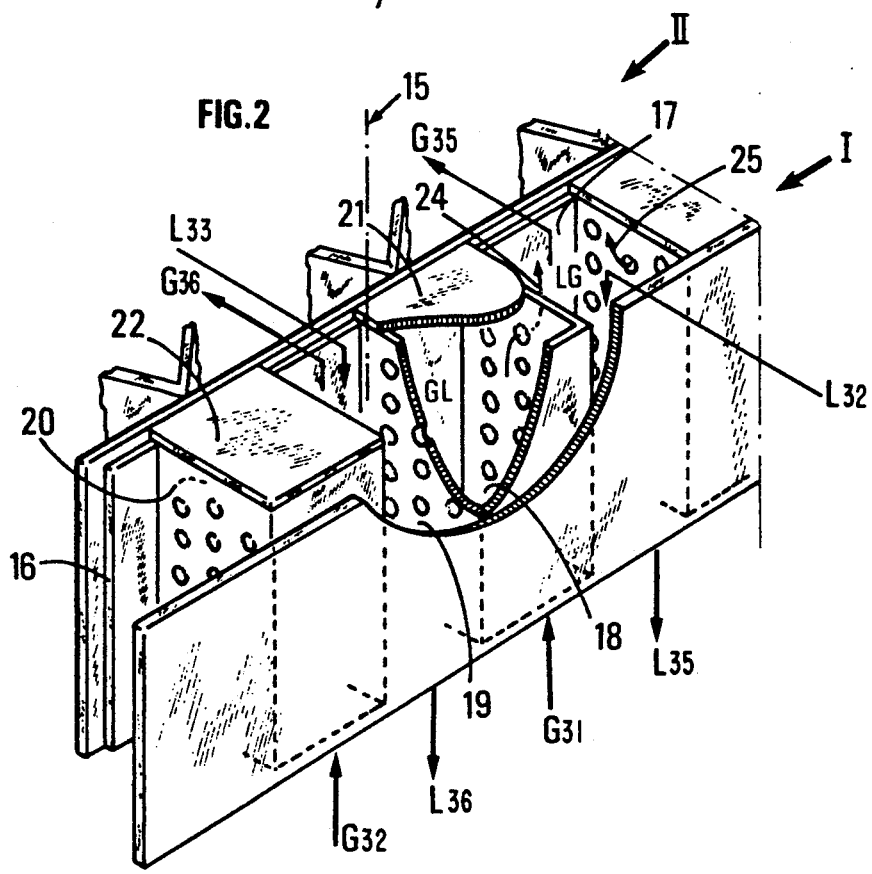

FIG. 2 represents a preferred version of the invention which requires passage of the vapor phase, or gas phase, from one space to the adjacent spaces. This version may be described on the basis of the example in FIG. 1.

The exchanger according to the invention is always in the vertical position. The axis of waves 15 is disposed in the Type I compartments in the general direction of flow, i.e. vertically. Corrugated spacer plates 16 of the Type I compartments form waves, of rectangular or square cross section, for example. Subcompartments or spaces 17, 18, 19, 20 thus formed are blocked alternately in the upper parts by plugs 21, 22. Blocked spaces 18, 20 are of the type known as the GL type, and the others are of the LG type. These plugs can be made of pieces of welded sheet metal.

FIG. 3 is a top view of the exchanger of FIG. 2.

The walls delimiting spaces LG and GL are: walls A and B (FIG. 3) common to spaces LG and GL, perpendicular to the plates separating compartments I and II and perforated to allow circulation of gas from space GL to space LG; and walls C formed by the wave; and walls D formed by the plate separating compartments I and II. Both are provided with turbulence promoters designed to break the liquid film trickling down walls D and C to increase contact between the gas phase and the liquid phase. Fluid E circulates in compartment II, exchanging heat with the gas phase and the liquid phase or phases circulating counter-current-wise in compartment I.

In FIG. 2, the waves of the corrugated spacer plates of compartments II also have a vertical axis and are sawtooth-shaped.

The liquid phase is injected into the upper transverse part at L32, L33 into the spaces of the LG type in order to trickle down in the form of a liquid film along the wave walls. The gas is injected into the lower transverse part of the device at G31, G32 into the GL type spaces and moves vertically upward.

This arrangement requires the different phases to circulate. Vapor phase G circulates downward in the GL type space. Turbulence promoters 23 favor contact between the vapor phase and the liquid phase, particularly the phase coming from condensation of vapor phase G. Moreover, vapor phase G introduced into a GL compartment is forced by plugs 21, 22 in the upper parts of the GL spaces to penetrate the LG spaces through the perforations in the waves on walls A and B, and is hence forced to traverse liquid phase L which trickles in a liquid film all the way down the perforated walls of the waves, as shown by arrows 24 and 25. This brings about an intimate counter-current contact between gas phase G and liquid phase L, allowing a substantial exchange of material between these phases. This configuration, by transferring material, allows enrichment of gas phase G with light compounds from liquid phase L and hence enrichment of the liquid phase with heavy compounds coming from the gas phase. This material transfer from one phase to the other is accompanied by a heat transfer with fluid F, through waves which are preferably made of a conducting material. Liquid phase L is recovered at L35, L36 in the lower part of the device below the gas injection point. The vapor phase is recovered in the upper part of G35, G36 located above liquid injection L32, L33.

To prevent gases G31, G32 penetrating the LG type compartments 18, 20 through their lower parts, these type LG compartments may be extended until they penetrate the liquid phase located at the lower part of the device according to the invention. The compartments of the GL type do not penetrate this liquid phase, so it is possible to supply them with gas via the free spaces in the interface of the liquid phase at the bottom of the device and the bottom parts of these GL compartments.

Thus, the process according to the invention consists of simultaneously effecting a material exchange between a gas phase G and at least one liquid phase L by counter-current contact and a heat exchange with at least one fluid F. The contact is effected in a device having a stack of plane vertical plates separated by corrugated spacer plates, forming at least two alternating series of compartments I and II, compartments I being traversed counter-current-wise by liquid phase L and gas phase G and compartments II by fluid F exchanging heat with liquid phase L and gas phase G. The corrugated spacer plates located in compartments I are perforated, with the open fraction formed by these perforations being between 3% and 30%, said liquid phase forming a film at the surfaces of said corrugated plates and the gas phase passing all the way through the corrugated plates through the perforations.

In the example of FIGS. 1 and 2, the corrugated spacer plates located in the Type I compartments form waves in a vertical direction.

In another embodiment, the waves are inclined alternately in directions that are symmetrical relative to a horizontal plane (FIG. 5).

The device is placed vertically, and fluid F circulates in compartments II, exchanging heat with the various phases circulating in compartment I. Said compartment I is composed of corrugated spacer plates or zig-zag plates 28 which form waves inclined alternately in directions that are symmetrical relative to a horizontal plane or direction. These waves are perforated to permit circulation and contact of the various phases. The liquid phase is injected into the upper part and trickles downward on the waves, forming a liquid film on the inclined parts of the waves. The gas is injected at the lower part of the device. It circulates upward passing through the perforations in the waves and the film or bathing the film. The contact between vapor phase G and liquid phase L is intimate, and favors material transfer.

The overall or average direction of spacer walls 20 is vertical. These walls delimit channels which are also zig-zag-shaped.

The heat exchange with fluid F is simultaneous and occurs through the corrugated spacer plates made of a heat-conducting material. The liquid phase flows through the perforations and is recovered in the lower part of the device, the gas phase being evacuated in the upper part. The channels join these two parts directly.

The comparison between the various wave designs, with vertical or inclined axes and with broken lines or walls, has to do essentially with the efficiency of material transfer. The variant of the process in which the waves are inclined alternately may, for certain applications, have the advantages of the design with vertical waves regarding the pressure loss in compartments I, while allowing efficient transfer of material.

The process according to the invention does not necessarily, as described in the various embodiments described previously, require injection of a liquid phase into the upper part of the device. Indeed, for certain applications, for example for certain rich gas treatments, it is not necessary for there to be a liquid injection. In this case, the gas is injected at the lower part of the device, into compartments I. The heat transfer between compartment I and compartment II causes the heaviest compounds in the gas to condense. This condensate forms on the surfaces of the waves, trickles downward forming a liquid film or a liquid interface, or both at the same time, depending on the design selected. Under these conditions, the condensate is in intimate contact with the gas phase which circulates upward through the perforations in the waves, and thus traverses the liquid film or liquid interface bringing about material transfer between the gas phase and the liquid phase. The gas thus treated exits the upper part of the device while the liquid phase composed of the heaviest products in the gas is evacuated through the lower part of the device.

The process according to the invention does not necessarily require injection of a gas into the lower part of the device. In certain applications, for example for regeneration of an absorption solvent contaminated by volatile compounds, the process allows this solvent to be purified by vaporization of the volatile compounds. In this case, the solvent is injected into the upper part of the device, in the Type I compartments, and circulates downward. Heat-carrying fluid F circulates in the Type II compartments and supplies heat energy to the solvent circulating in compartments I. The heat exchange so effected causes the most volatile compounds of the solvent to vaporize, forming a gas phase which circulates upward through the perforations in the waves, thus passing through the liquid interface, or the liquid film, or both depending on the choice of said arrangement. Under these conditions, the gas phase and the liquid phase circulate counter-current-wise [and] are in intimate contact, which allows material transfer to take place between phases. The solvent, thus purified of the volatile compounds, is collected in the lower part of the device, with the gas phase thus generated being evacuated at the upper part of the device.

Figure 6:
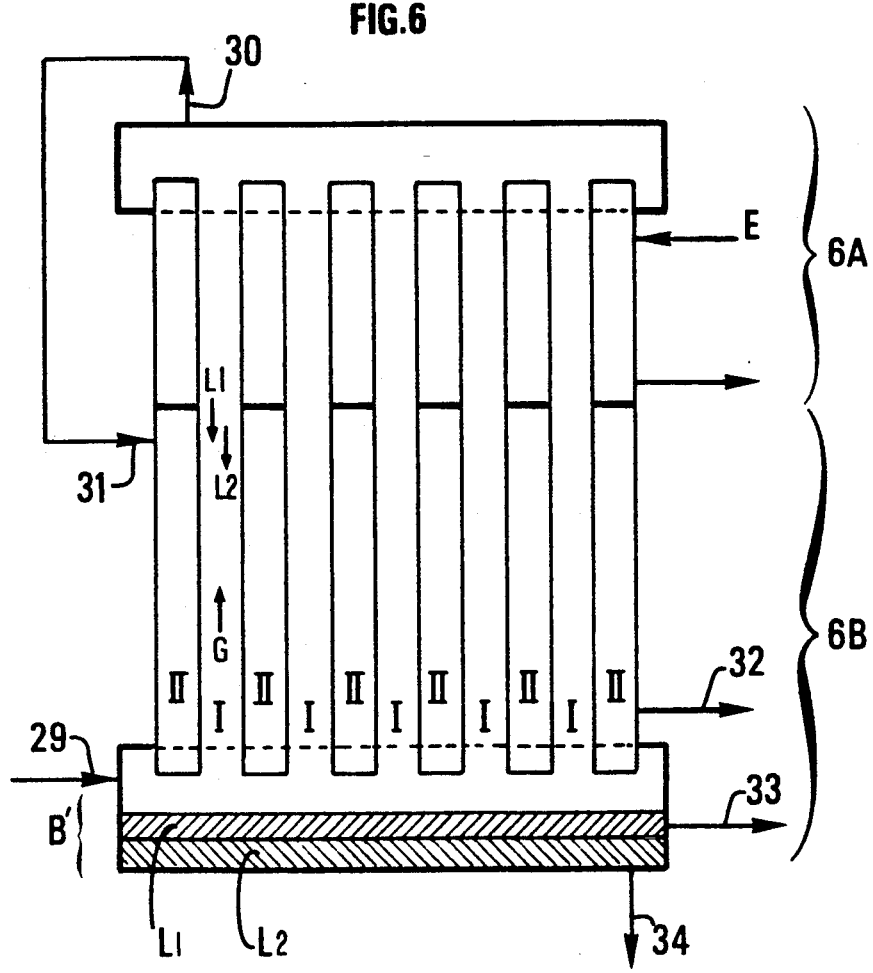
FIG. 6 illustrates the process according to the present invention applied to stripping and dehydration of a gas.

The device according to the invention also allows counter-current contact between a gas phase G and two immiscible liquid phases L1 and L2. This option allows a gas to be stripped and dehydrated, for example, in a single device. The flowchart of such a process may be described from an embodiment illustrated by the diagram in FIG. 6. The gas is injected into the lower part of the device at 29 into the Type I compartments. This gas is composed for example of methane, hydrocarbons with a carbon number higher than that of methane, water, and methanol. This gas is cooled by the fluid circulating in the Type II compartments of zone 6B. This addition of cold causes condensation of some of the gas injected into two distinct liquid phases. Liquid phase L1 is composed essentially of non-methane hydrocarbons, while liquid phase L2 is composed largely of methanol and water. Gas phase G circulates upward and penetrates compartment I of zone 6A of the device. Zone 6A surmounts and extends zone 6B. This phase G is cooled by a fluid F circulating in compartments II of said zone 6A. Liquid phases L1 and L2 formed by condensation circulate downward in all or part of the device. The treated gas evacuated at 30 in the upper part of zone 6A is reinjected at 31 into the Type II compartments of zone 6B of the device in order to effect a heat exchange to transfer cold from the treated gas to the gas to be treated. Condensation of the latter thus causes formation of liquid phases L1 and L2. The treated gas is evacuated from the device at 32. Liquid phases L1 and L2 are separated by decantation in the lower part of zone B, and evacuated through lines 33 and 34, respectively. The transfer of material between phases is linked, as in the previous examples, to counter-current circulation of the vapor phase and the two liqid phases, and to the intimate contact between phases brought about by the circulation of the vapor phase through the perforations in the waves, thus allowing this gas phase to penetrate the liquid film or the liquid interface formed on the walls of the waves by said liquid phases L1 and L2. This transfer of material between phases is accompanied simultaneously by heat transfer with a heat-carrying fluid E and in the lower part with the treated gas, to recover the cold contained in this gas in order to improve the energy balance of the process.

Thus, the device for implementing this process has compartments II each of which is divided in half. This provides two different routes for the heat-carrying fluid, these routes being superimposed and delimiting zones 6A and 6B.

Figure 7:
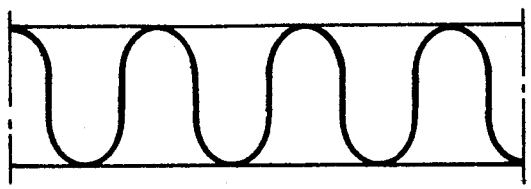
FIGS. 7 and 8 illustrate waves of sinusoidal and square shapes.
Figure 8:
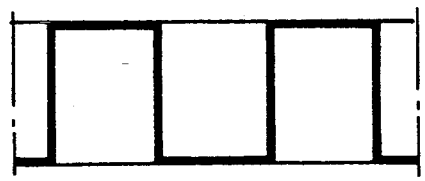

The waves may be of different shapes. The cross section may be sinusoidal (FIG. 7) or square, or crenelated (FIG. 8) allowing a greater area of the liquid interface and better contact between the plates separating compartments I and II, thus favoring heat transfer.

The perforations may be made according to different geometries: round (FIG. 9), square (FIG. 10), hexagonal, or oblong (FIG. 4). In the case where the holes are oblong, the generatrix of these holes is preferably parallel to the axis of the waves.

The distance between the plates of a compartment is between 3 and 50 millimeters for example, preferably between 3 and 20 or between 3 and 15 millimeters. In this case, the round holes will preferably have a diameter less than one-third of the distance between the plates, which gives diameters between 1 and 5 millimeters for the example in question. The perforated fraction of the passages is between 3% and 30%, preferably between 3% and 20%.

The device as a whole may be made of different materials. It may be made, for example, of aluminum or light alloys (duralumin, etc.), and assembled by brazing for example. It may also be made of steel, for example stainless steel (316, 304, etc). The use of non-metal materials, in particular polymer and ceramic materials, may also be considered, provided these materials have thermal conductivity characteristics compatible with the application in view.

The various compartments are fed with fluid in a manner known to the individual skilled in the art.

We claim:

1. A process for simultaneously exchanging material and heat, the material exchange being made between a gas phase and at least one liquid phase by contact of the phases and passage of the gas phase and of the at least one liquid phase in opposite directions, characterized in that the material exchange is effected by causing said at least one liquid phase to flow over a substantially vertical or inclined wall of a corrugated spacer plate having perforations therethrough and by causing at least a fraction of said gas phase to traverse simultaneously said perforations in a substantially ascending direction and to contact said at least one liquid phase, said material exchange being made in a compartment (I) which includes a plurality of said spacer plates having perforations and defining material exchange passages, said compartment (I) having a common wall with at least one compartment (II) having imperforate vertical spacer plates so that a heat exchange is effected simultaneously with the material exchange by circulating a heat exchange fluid (F) in said compartment (II), the heat exchange being achieved between the phases in compartment (I) and the heat exchange fluid (F) circulating in compartment (II); said compartment (I) having a lower end and an upper end, the gas phase entering said compartment (I) at the lower end and then ascending a subcompartment defined by a substantially vertical or inclined wall of a corrugated spacer plate, said subcompartment being closed at the upper end of the compartment (I) so that the gas phase is directed into another adjacent subcompartment via said perforations to effect the material exchange with the at least one liquid phase, a gas phase being discharged from said another subcompartment at the upper end of the compartment (I) and at least one liquid phase being discharged from said another subcompartment at the lower end of the compartment (I).

2. A process according to claim 1 characterized by causing the totality of said gas phase to traverse said perforations.

3. A process according to claim 1 characterized by said substantially vertical or inclined walls delimiting channels in which liquid phase (L) and gas phase (G) circulate at least partially and by at least part of said channels directly connecting the gas and liquid phase inlets and outlets.

4. A process according to one of claims 3 characterized by circulation of said at least one liquid phase being effected by gravity.

5. A process according to claim 4 characterized by a counter-current contact being effected between a gas phase (G) and a liquid phase (L) formed at least in part by condensation of at least part of the gas phase, a cooling required to condense a fraction of the gas phase in order to obtain a liquid phase being supplied at least in part by heat exchange with fluid (F).

6. A process according to claim 1 characterized by a counter-current contact being effected between a liquid phase (L) and a gas phase (G) formed at least in part by vaporization of at least part of a liquid phase, the heat necessary for vaporizing a fraction of a liquid phase in order to obtain the gas phase being supplied at least in part by heat exchange with fluid (F).

7. A process according to claim 1, wherein the at least one liquid phase, the gas phase or a mixture thereof comprise a petroleum effluent.

8. A process for simultaneously exchanging material and heat, the material exchange being made between a gas phase and at least one liquid phase by contact of the phases and passage to the gas phase and of the at least one liquid phase in opposite directions, characterized in that the material exchange is effected by causing said at least one liquid phase to flow over a substantially vertical or inclined wall of a corrugated spacer plate having perforations therethrough and by causing at least a fraction of said gas phase to traverse simultaneously said perforations in a substantially ascending direction to contact said at least one liquid phase, said material exchange being made in a compartment (I) which includes a plurality of said spacer plates having perforations and defining material exchange passages, said compartment (I) having a common wall with at least one compartment (II) having imperforate vertical spacer plates so that a heat exchange is effected simultaneously with the material exchange by circulating a heat exchange fluid (F) in said compartment (II), the heat exchange being achieved between the phases in compartment (I) and the heat exchange fluid (F) circulating in compartment (II), a counter-current contact being effected between a gas (G) containing methane, hydrocarbons other than methane, water, and methanol and two liquid phases (L1) and (L2) formed by condensation of at least part of gas (G), liquid phase (L1) being formed from the hydrocarbons other than methane and liquid phase (L2) being formed from a solution of methanol and water.

9. A device for simultaneously effecting a material exchange between a gas phase (G) and at least one liquid phase (L) by counter-current contact and for effecting heat exchange between said phases and at least one heat exchange fluid (F), said device comprising several essentially flat, vertical plates separated by corrugated spacer plates constituting at least two alternating series (I) and (II) of compartments, the compartments of the second series (II) being traversed by a heat exchange fluid (F) exchanging heat with the at least one liquid phase (L) and the gas phase (G) in a first series (I) of compartments, the first series (I) and the second series (II) of compartments having at least a common wall, the corrugated spacer plates located in the compartments of the first series (I) having perforations, and forming waves defining passages with an essentially vertical direction and means for traversing the compartments in the first series (I) counter-current-wise with the at least one liquid phase (L) and the gas phase (G), at least a portion of the gas phase (G) passing through said perforations and the at least one liquid phase flowing over a substantially vertical or inclined wall of a corrugated spacer plate having said perforations; the corrugated spacer plates located in the second series (II) of compartments being imperforate; said compartments of the first series (I) each having a lower end and an upper end, means for introducing the gas phase into the lower end of the compartments in the first series (I) so that the gas phase initially ascends a subcompartment defined by a substantially vertical or inclined wall of a corrugated spacer plate, said subcompartment being closed at the upper end of a compartment of the series (I) so that the gas phase is directed into another adjacent subcompartment via the perforations to effect material exchange with the at least one liquid phase and means for discharging a gas phase from the another subcompartment at the upper end of the compartment of the series (I).

10. A device according to claim 9 wherein said spacer plates define a plurality of subcompartments in which liquid (L) and gas (G) and at least some of the subcompartments are in fluid communication directly with the upper and lower ends of the compartment of series (I).

11. A device for simultaneously effecting a material exchange between a gas phase (G) and at least one liquid phase (L) by counter-current contact and for effecting heat exchange between said phases and at least one heat exchange fluid (F), said device comprising several essentially flat, vertical plates separated by corrugated spacer plates constituting at least two alternating series (I) and (II) of compartments, the compartments of the second series (II) being traversed by a heat exchange fluid (F) exchanging heat with the at least one liquid phase (L) and the gas phase (G) in a first series (I) of compartments, the first series (I) and the second series (II) of compartments having at least a common wall, the corrugated spacer plates located in the compartments of the first series (I) having perforations, and forming waves defining passages with an essentially vertical direction and means for traversing the compartments in the first series (I) counter-current-wise with the at least one liquid phase (L) and the gas phase (G), at least a portion of the gas phase (G) passing through said perforations and the at least one liquid phase flowing over a substantially vertical or inclined wall of a corrugated spacer plate having said perforations; the corrugated spacer plates located in the second series (II) of the compartment being imperforate; the gas phase entering the device through subcompartments whose openings are located on one side of said corrugated spacer plates and leaving the device through subcompartments whose outlets are located on the opposite side of said corrugated spacer plates.

12. A device according to one of claims 9 to 11 characterized by the open fraction formed by the perforations being between 3% and 30%, preferably between 3% and 20% relative to the surfaces of the corrugated plates, said at least one liquid phase forming a film at the surface of said corrugated plates and said gas phase passing all the way through said corrugated plates, through said perforations.

13. A device according to claim 12 characterized by the corrugated spacer plates located in the first series (I) compartments forming waves inclined alternately in directions that are symmetrical relative to horizontal, the average direction of the passages delimited by these waves being essentially vertical.

14. A device according to claim 9 characterized by the corrugated spacer plates located in the first series (I) compartments forming waves with a square or sinusoidal cross section.

15. A device according to claim 9 characterized by the perforations being round in shape and having diameters between 1 and 5 millimeters.

16. A device according to claim 9 characterized by the corrugated spacer plates being provided with turbulence promoters.

17. A device according to claim 9 characterized by the distance between the plates forming compartments (I) being between 3 and 50 millimeters.

18. A device according to claim 9 characterized by the device D-being made from aluminum plates assembled by brazing.

* * * * *